(12) United States Patent
Hyun et al.

(10) Patent No.: US 10,262,532 B2
(45) Date of Patent: Apr. 16, 2019

(54) SYSTEM AND METHOD FOR PROVIDING FORWARD TRAFFIC LIGHT INFORMATION DURING STOP

(71) Applicants: Hyundai Motor Company, Seoul (KR); Kia Motors Corporation, Seoul (KR)

(72) Inventors: Dong Jin Hyun, Gyeonggi-do (KR); Jun Yeong Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/825,322

(22) Filed: Nov. 29, 2017

(65) Prior Publication Data
US 2018/0350235 A1   Dec. 6, 2018

(30) Foreign Application Priority Data
Jun. 1, 2017 (KR) .................. 10-2017-0068326

(51) Int. Cl.
*B60Q 3/80* (2017.01)
*G06K 9/00* (2006.01)
*B60K 35/00* (2006.01)
*B60R 11/04* (2006.01)
(Continued)

(52) U.S. Cl.
CPC ......... *G08G 1/09623* (2013.01); *B60K 35/00* (2013.01); *B60Q 3/80* (2017.02);
(Continued)

(58) Field of Classification Search
CPC .......... B60W 50/14; B60W 2050/007; B60W 2050/146; B60W 2550/402;
(Continued)

(56) References Cited

U.S. PATENT DOCUMENTS 6,650,999 B1 * 11/2003 Brust .................... B60R 25/102
340/932.2
7,395,151 B2 * 7/2008 O'Neill .............. G01C 21/3407
701/411
(Continued)

FOREIGN PATENT DOCUMENTS

CN       106097739      11/2016
KR       10-0216041      8/1999
(Continued)

*Primary Examiner* — Fekadeselassie Girma
(74) *Attorney, Agent, or Firm* — Mintz Levin Cohn Ferris Glovsky and Popeo, P.C.; Peter F. Corless

(57) ABSTRACT

A method of providing forward traffic light information during a stop includes capturing a front image in a vehicle, detecting traffic light information from the front image, and outputting a notification corresponding to the traffic light information to a mobile terminal or the vehicle depending on at least one of a communication state with the mobile terminal and a monitor state of the mobile terminal. A system for providing forward traffic light information during a stop includes a mobile terminal, and a vehicle that captures a front image and to detect traffic light information from the front image, where a notification corresponding to the traffic light information is output to the mobile terminal or the vehicle depending on at least one of a communication state with the mobile terminal and a monitor state of the mobile terminal.

20 Claims, 6 Drawing Sheets

(51) Int. Cl.
*G08G 1/095* (2006.01)
*H04M 1/725* (2006.01)
*G08G 1/0962* (2006.01)

(52) U.S. Cl.
CPC .......... *B60R 11/04* (2013.01); *G06K 9/00825* (2013.01); *G08G 1/095* (2013.01); *H04M 1/72522* (2013.01); *B60Y 2200/10* (2013.01)

(58) Field of Classification Search
CPC . B60W 30/0956; H04W 4/046; H04W 4/027; B60Q 5/006; G05D 1/0214; G05D 1/0246; G06K 9/00798; G06K 9/00818; G06K 9/00825; G08G 1/0125; G08G 1/0133; G08G 1/091; G08G 1/166; G09G 2320/0666; G09G 2320/0686; G09G 5/003

See application file for complete search history.

(56) References Cited

U.S. PATENT DOCUMENTS

| | | | | |
|---|---|---|---|---|
| 9,224,294 B1* | 12/2015 | St. John | ............ | G08G 1/0965 |
| 9,679,487 B1* | 6/2017 | Hayward | ............ | G08G 1/166 |
| 10,029,696 B1* | 7/2018 | Ferguson | ............ | B60W 40/09 |
| 2003/0132859 A1* | 7/2003 | Bissett | ............ | B64D 45/0015 340/945 |
| 2012/0226646 A1* | 9/2012 | Donoho | ............ | G06Q 10/101 706/46 |
| 2014/0118168 A1* | 5/2014 | Lee | ............ | G08G 1/096725 340/905 |
| 2014/0280319 A1* | 9/2014 | Rishe | ............ | G06F 17/30241 707/769 |
| 2015/0179088 A1* | 6/2015 | Raman | ............ | G09B 21/001 348/62 |
| 2016/0349066 A1* | 12/2016 | Chung | ............ | G01C 21/3415 |
| 2018/0170375 A1* | 6/2018 | Jang | ............ | B60K 28/06 |
| 2018/0196442 A1* | 7/2018 | Wang | ............ | G05D 1/0274 |

FOREIGN PATENT DOCUMENTS

| | | |
|---|---|---|
| KR | 2000-0014456 | 3/2000 |
| KR | 10-2005-0041370 | 11/2005 |
| KR | 10-2013-0079874 | 7/2013 |
| KR | 10-2012-0029337 | 1/2014 |
| KR | 10-2014-0062971 | 7/2014 |
| KR | 10-2014-0091355 | 7/2014 |
| KR | 10-1480777 | 1/2015 |
| KR | 10-1683242 | 12/2016 |

\* cited by examiner (a)        (b)

(a)        (b)

SYSTEM AND METHOD FOR PROVIDING FORWARD TRAFFIC LIGHT INFORMATION DURING STOP

This application claims under 35 U.S.C. § 119(a) the benefit of Korean Patent Application No. 10-2017-0068326, filed on Jun. 1, 2017, the entire contents of which are incorporated by reference herein.

BACKGROUND (a) Technical Field

The present disclosure relates to a system and method for providing forward traffic light information during a stop, and more particularly, to a system for providing information on a current signal situation during a stop even if a driver who is waiting for a signal does not look forward, for enhancing driver convenience.

(b) Description of the Related Art

To acquire outside information such as a traffic light state or limit speed, a driver needs to check a traffic light or direction board which is fixedly installed on a road, with the naked eye. However, when a driver does not look forward, he or she is not capable of checking outside information such as the state of a traffic light in sufficient time and thus may be exposed to accident risk.

According to conventional technologies, to prevent this, traffic light information is recognized and a warning sound (e.g., from a horn) may be transmitted to a driver that does not accurately recognize traffic light information, or the driver is warned through vibration of a steering wheel. For example, the driver may suddenly recognize traffic light information, and thus, there is a problem in that safe driving is interrupted due to a sudden start.

In addition, according to conventional technologies, when a vehicle driver does not look a traffic light during a stop, he or she does not start despite a signal change of the traffic light, and thus, there is a problem in that traffic flow is interrupted.

SUMMARY

An object of the present disclosure is to provide a system and apparatus for providing forward traffic light information during a stop.

In particular, current traffic light information may be smoothly transmitted to a driver through a mobile terminal or indoor lighting of a vehicle to enhance driver convenience.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of providing forward traffic light information during a stop includes capturing a front image in a vehicle, detecting traffic light information from the front image, and outputting a notification corresponding to the traffic light information to a mobile terminal or the vehicle depending on at least one of a communication state with the mobile terminal and a monitor state of the mobile terminal.

In another aspect of the present disclosure, a system for providing forward traffic light information during a stop includes a mobile terminal, and a vehicle that captures a front image and to detect traffic light information from the front image, where a notification corresponding to the traffic light information is output to the mobile terminal or the vehicle depending on at least one of a communication state with the mobile terminal and a monitor state of the mobile terminal.

In another aspect of the present disclosure, a non-transitory computer readable medium containing program instructions executed by a processor includes program instructions that capture a front image in a vehicle; program instructions that detect traffic light information from the front image; and program instructions that output a notification corresponding to the traffic light information to a mobile terminal or the vehicle depending on at least one of a communication state with the mobile terminal and a monitor state of the mobile terminal.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
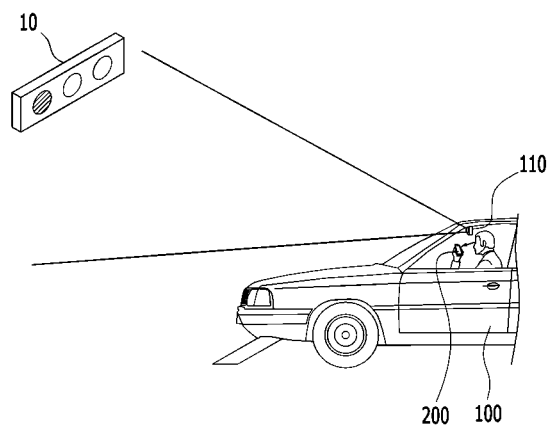
FIG. 1 is a schematic diagram illustrating a traffic light information providing system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Embodiments of the present disclosure relates to a system and method for providing forward traffic light information during a stop so as to receive information on a current signal situation through a mobile terminal by using a system for providing forward traffic light information during a stop even if a driver who is waiting for a signal does not look forward (i.e., direct his or her attention to a traffic light positioned in front of the vehicle). Accordingly, the mobile terminal and/or interior lights of the vehicle can provide a notification to the driver to alert the driver as to the changed traffic light.

FIG. 1 is a schematic diagram illustrating a traffic light information providing system according to an embodiment of the present disclosure.

Referring to FIG. 1, a vehicle 100 may stop at a red signal of a traffic light 10 during a driving operation.

In this case, a driver may frequently view a mobile terminal 200 or does not focus without looking forward, and thus, even if a traffic light changes, he or she may not start and may interrupt traffic flow.

According to the present disclosure, a camera unit 110 installed in the vehicle 100 may photograph a forward traffic light of a vehicle, may detect traffic light information from the captured image, and may provide current traffic light information to a driver.

That is, the present disclosure proposes a system and method for providing forward traffic light signal information during a stop for convenience of a driver by smoothly transmitting information on a current signal situation to the driver through a mobile terminal or indoor lighting of a vehicle.

Figure 2:
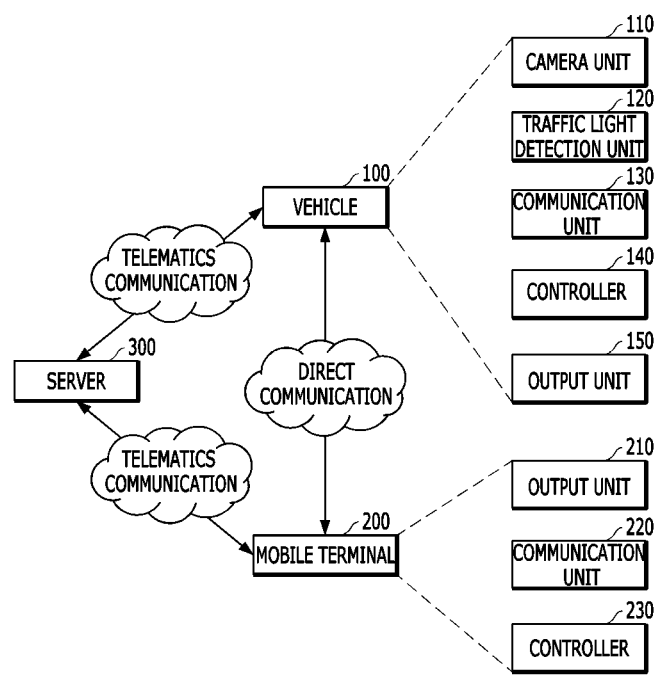
FIG. 2 is a block diagram illustrating a structure of a system for providing forward traffic light information during a stop according to an embodiment of the present disclosure.

FIG. 2 is a block diagram illustrating a structure of a system for providing forward traffic light information during a stop according to an embodiment of the present disclosure.

Referring to FIG. 2, the system for providing for providing forward traffic light information during a stop may include the vehicle 100, the mobile terminal 200, and a server 300.

The vehicle 100 may include the camera unit 110, a traffic light detection unit 120, a communication unit 130, a controller 140, and an output unit 150.

The camera unit 110 may photograph the front of a vehicle to correspond to the speed and position of the vehicle. The camera unit 110 may be attached to an upper end of the vehicle 100 and may photograph the traffic light 10 in front of the vehicle. The camera unit 110 may transmit the captured front image to the traffic light detection unit 120.

The traffic light detection unit 120 may process the image captured by the camera unit 110 to extract an image containing the traffic light 10 and may recognize a signal for the traffic light 10 that is currently lit to detect traffic light information.

The communication unit 130 may wirelessly exchange data with another device installed inside or outside the vehicle 100 by using a wireless method. In particular, the other device may include the mobile terminal 200 and the server 300.

The communication unit 130 may directly communicate with the mobile terminal 200. The direct communication method may perform short-distance wireless communication using at least one of technologies of Bluetooth™, radio frequency identification (RFID), infrared data association (IrDA), ultra-wideband (UWB), ZigBee, near field communication (NFC), wireless-fidelity (Wi-Fi), Wi-Fi direct, and wireless universal serial bus (USB). The communication unit 130 may directly communicate with a vehicle by wire. The connection by wire may include USB connection.

The communication unit 130 may communicate with the mobile terminal 200 via telematics communication.

The telematics communication may include wireless broadband (WiBro), world interoperability for microwave access (WiMAX), high speed downlink packet access (HSDPA), high speed uplink packet access (HSUPA), long term evolution (LTE), long term evolution-advanced (LTE-A), etc. The communication unit 130 may transmit and receive data by using at least one wireless communication technology that contains communication technologies that have not been listed above.

For example, the communication unit 130 may wirelessly exchange data with the external server 300. The communication unit 130 may receive monitor state information of the mobile terminal 200 via direct communication and telematics communication.

The controller 140 may receive vehicle information containing position, direction, and speed information of a vehicle from a sensor (not shown) of the vehicle. The controller 140 may determine stopping and moving of the vehicle based on the position, direction, and speed information of the vehicle.

The controller 140 may receive the monitor state information of the mobile terminal from the communication unit 130 and may generate a control signal to output traffic light information in the vehicle according to the monitor state information or to output traffic light information through the mobile terminal 200.

For example, when a monitor of a mobile terminal is turned off, a driver does not see the mobile terminal and, thus, the controller 140 may output traffic light information in the vehicle. When the monitor of the mobile terminal is turned off, the controller 140 may generate a control signal for controlling indoor lighting of the vehicle.

For example, when the traffic light 10 illuminates a red signal, the controller 140 may generate a control signal for turning on the indoor lighting of the vehicle.

For example, when the traffic light 10 illuminates a green signal, the controller 140 may generate a control signal for turning off the indoor lighting of the vehicle.

The output unit 150 may receive a control signal corresponding to traffic light information from the controller 140. The output unit 150 may include a display, a speaker, a steering wheel, an indoor lighting, and other known components.

For example, when the output unit 150 is indoor lighting, the vehicle 100 may stop, and when a traffic light is a red signal, the indoor lighting may be turned on.

When the traffic light illuminates a green signal, the indoor lighting of the vehicle 100 may be turned off.

For example, when the output unit 150 is a speaker, the speaker output unit 150 may provide a voice signal corresponding to the traffic light information For example, when the output unit 150 is a steering wheel, vibration of the steering wheel may be provided to correspond to the traffic light information.

The mobile terminal 200 may include an output unit 210, a communication unit 220, and a controller 230. The mobile terminal 200 may display traffic light information on a monitor of the mobile terminal through an application.

The output unit 210 may include a display, a speaker, and other known components.

For example, the output unit 210 may overlay a pop-up window so as to display traffic light information on a monitor of the mobile terminal 200. The pop-up window may be output as an icon shaped like a traffic light.

The output unit 210 may change color of at least partial region of the monitor of the mobile terminal 200 to output traffic light information.

For example, when the traffic light 10 illuminates green, the output unit 210 may output green on an entire monitor of the mobile terminal 200.

The communication unit 220 may exchange traffic light information with the vehicle 100 via direct communication and wireless communication. The communication unit 220 may communicate with the server 300 via telematics.

The controller 230 may generate a control signal so as to always display traffic light information on the monitor of the mobile terminal 200 in a form similar to a pop-up window on the monitor of the mobile terminal 200.

The controller 230 may generate a control signal to change entire color of the monitor of the mobile terminal in response to the traffic light information.

The server 300 may wirelessly exchange data with the vehicle 100 and the mobile terminal 200. For example, the server 300 may receive traffic light information and vehicle number (i.e., a number assigned to the vehicle 100) that are determined by the vehicle 100 via wireless communication.

When the server 300 previously owns information on the mobile terminal 200 corresponding to the vehicle 100, the server 3400 may transmit the data received from the vehicle 100 to the mobile terminal 200 corresponding to the vehicle number. When the mobile terminal 200 is logged into the server 300 using vehicle number information, the server 300 may transmit traffic light information to the corresponding mobile terminal 200.

Figure 3:
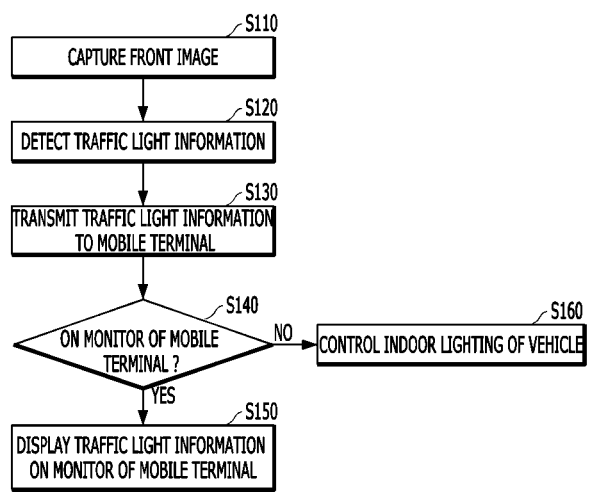
FIG. 3 is a flowchart of a method of providing forward traffic light information during a stop according to an embodiment of the present disclosure.

FIG. 3 is a flowchart of a method of providing forward traffic light information during a stop according to an embodiment of the present disclosure.

Referring to FIG. 3, in the method of providing the forward traffic light information during a stop, when vehicle speed is zero or a vehicle position is not changed for a preset time period, the camera unit 110 of the vehicle may photograph the front of the vehicle (S110). The camera unit 110 may transmit the captured front image to the traffic light detection unit 120.

An image of the traffic light 10 may be extracted and a signal of the traffic light 10 that is currently lit may be recognized to detect the traffic light information based on the front image received from the camera unit 110 (S120).

The vehicle 100 may transmit traffic light information corresponding to a communication state of the mobile terminal 200 (S130). For example, the vehicle 100 may transmit the traffic light information by using different methods according to a case in which the vehicle 100 is capable of directly communicating with the mobile terminal 200 (e.g., short-distance wireless communication such as Bluetooth or wired communication such as USB) and a case in which the vehicle 100 is capable of directly communicating with the mobile terminal 200 and is capable of indirectly communicating with the mobile terminal 200 through a telematics center or the like (S130).

The vehicle 100 may receive monitor information of the mobile terminal 200 from the mobile terminal 200. The vehicle 100 may provide the traffic light information to correspond to an on or off state of the monitor of the mobile terminal 200 (S140).

When the monitor of the mobile terminal 200 is in an on state, the vehicle 100 may provide the traffic light information to the mobile terminal 200. The mobile terminal 200 may display the traffic light information on the monitor (S150).

When the monitor of the mobile terminal is in an off state, indoor lighting of the vehicle may be controlled to correspond to the traffic light information (S160).

Figure 4:
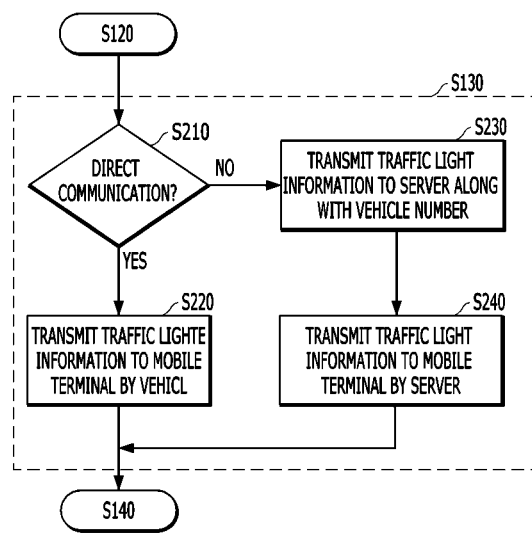
FIG. 4 is a flowchart of a communication flow between a vehicle and a mobile terminal according to an embodiment of the present disclosure.

FIG. 4 is a flowchart of a communication flow between a vehicle and a mobile terminal according to an embodiment of the present disclosure.

Referring to FIG. 4, in the method of providing forward traffic light information during a stop, a communication state between the vehicle 100 and the mobile terminal 200 may be determined. In this case, the vehicle 100 may be connected to the mobile terminal 200 via direct communication (S210).

When the vehicle 100 is connected to the mobile terminal 200 via direct communication, the vehicle 100 may transmit the traffic light information to the mobile terminal 200 (S220).

When the vehicle 100 is not connected to the mobile terminal 200 via direct communication, the vehicle 100 may match the traffic light information and the vehicle number and transmit the matched information to the server 300 (S230).

The determined traffic light information determined by the vehicle 100 along with the vehicle number may be transmitted to the server 300 and an application may be logged in the server 300 based on the vehicle number to receive the corresponding information. The mobile terminal may be logged in the server 300 based on the vehicle number and may receive the traffic light information corresponding to the vehicle number (S240).

Figure 5:
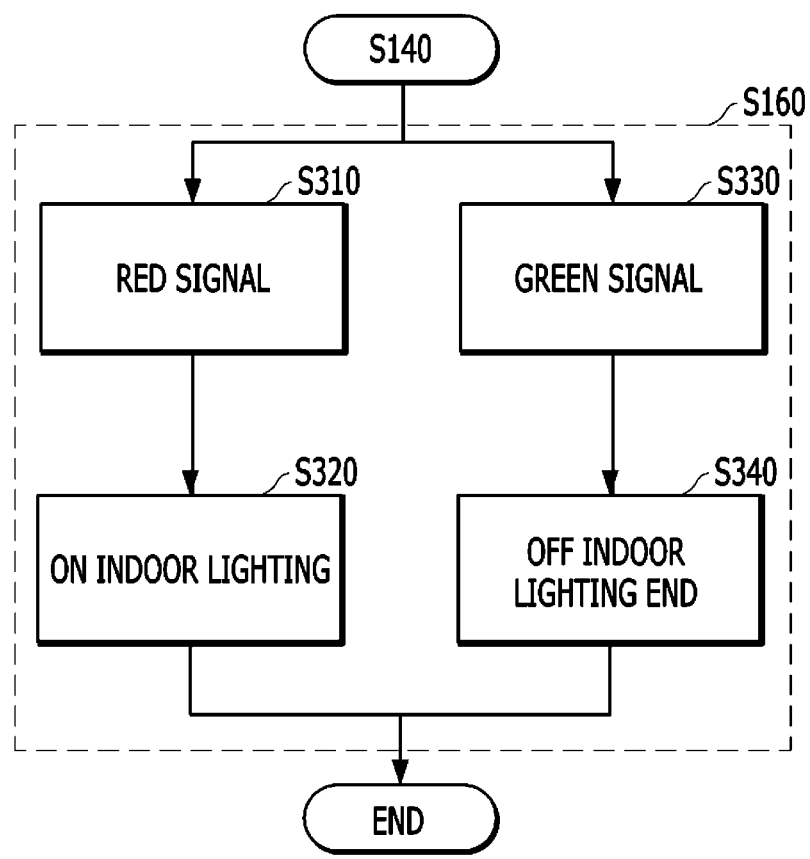
FIG. 5 is a flowchart of a method of controlling indoor lighting to correspond to traffic light information according to an embodiment of the present disclosure.

FIG. 5 is a flowchart of a method of controlling indoor lighting to correspond to traffic light information according to an embodiment of the present disclosure.

Referring to FIG. 5, the vehicle 100 may determine current traffic light information as a red signal (S310). When the traffic light information is a red signal, the vehicle 100 may turn on indoor lighting of a vehicle (S320).

The vehicle 100 may determine the current traffic light information as a green signal (S330). When the traffic light information is a green red, the vehicle 100 may turn off the indoor lighting of the vehicle (S340).

Figure 6:
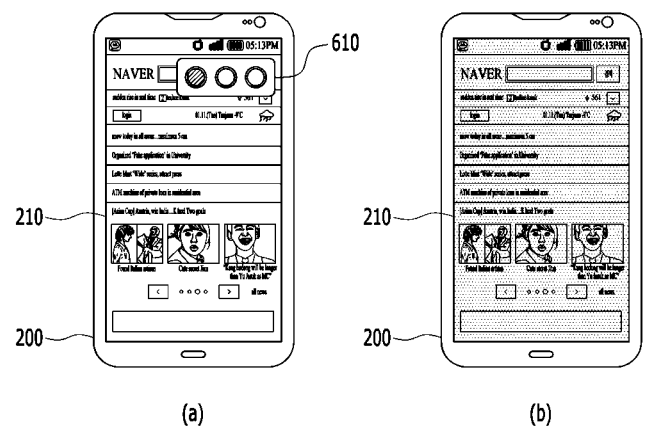
FIG. 6 is a diagram illustrating a monitor of a mobile terminal according to an embodiment of the present disclosure.

FIG. 6 is a diagram illustrating a monitor of the mobile terminal 200 according to an embodiment of the present disclosure.

Referring to FIG. 6(a), when the monitor of the mobile terminal 200 is turned on, the mobile terminal 200 may display the traffic light information on the monitor of the mobile terminal 200.

In this case, the traffic light information may be displayed as a traffic light icon 610.

For example, the traffic light icon 610 may be displayed in an order of a red circle, an orange color circle, and a red circle from a left side.

When outputting the traffic light information, the traffic light icon 610 may change a green circle, an orange color circle, and a red circle of a traffic light to other signs and may display a sign corresponding to a corresponding signal.

For example, when a front traffic light contains a left turn signal, the traffic light icon 610 may include a sign corresponding to left turn.

The traffic light icon 610 may be displayed to overlay the monitor of the mobile terminal 200 in a pop-up window. The traffic light icon 610 may be displayed on an upper end portion of the mobile terminal 200 but a position of the icon may be changed.

When the vehicle 100 and the mobile terminal 200 are connected, the pop-up window may be always displayed on the monitor of the mobile terminal 200. When the monitor of the mobile terminal 200 is changed, the pop-up window may also be output to the monitor of the mobile terminal 200.

For example, when the traffic light information is a red signal, the mobile terminal 200 may display a state in which an internal portion of a red circle of the traffic light icon may be displayed to be filled with red color. In this case, internal portions of the orange color circle and the green circle of the traffic light icon may be displayed to be empty.

For example, when the traffic light information is an orange color signal, the mobile terminal 200 may display a state in which an internal portion of the orange color circle of the traffic light icon is filled with red color. In this case, the internal portions of the red circle and the green circle of the traffic light icon may be displayed to be empty.

For example, when the traffic light information is a green signal, the mobile terminal 200 may display a state in which the internal portion of the green circle of the traffic light icon is filled with red color. In this case, the internal portions of the orange color circle and the green circle of the traffic light icon may be displayed to be empty.

The mobile terminal 200 may provide voice guidance in response to the traffic light information.

Referring to FIG. 6(b), when the monitor of the mobile terminal 200 is in an on state and the mobile terminal 200 receives the traffic light information from the vehicle 100, the mobile terminal 200 may display the traffic light information on the monitor as the output unit 210 of the mobile terminal 200.

A color of at least a partial region of the monitor of the mobile terminal 200 may be changed and the traffic light information may be displayed.

For example, when the traffic light information received from a vehicle is a green color, an entire monitor of the mobile terminal 200 may be changed to a green color.

For example, when the traffic light information received from the vehicle is an orange color, the entire monitor of the mobile terminal 200 may be changed to an orange color.

For example, when the traffic light information received from the vehicle is a red color, the entire monitor of the mobile terminal 200 may be changed to a red color.

The mobile terminal 200 may simultaneously use voice guidance to correspond to the traffic light information.

Figure 7:
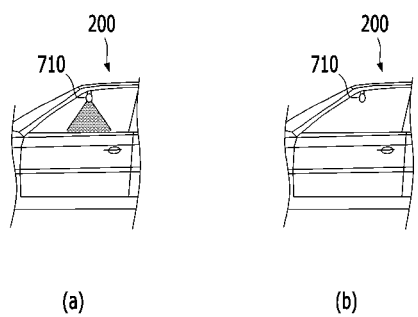
FIG. 7 is a diagram illustrating control of indoor lighting of a vehicle according to an embodiment of the present disclosure.

FIG. 7 is a diagram illustrating control of indoor lighting of a vehicle according to an embodiment of the present disclosure.

Referring to FIG. 7(a), when the monitor of the mobile terminal 200 is in an off state, the vehicle 100 may provide traffic light information to a device in the vehicle 100.

For example, when receiving a red signal as the traffic light signal, the output unit 150 may output indoor lighting 710 of the vehicle in an on state.

The vehicle 100 may include an illumination sensor (not shown) for sensing an amount of light in the vehicle. When the indoor lighting 710 is turned on, the controller 140 may adjust light-emitting intensity of the indoor lighting.

The light-emitting intensity may be set to appropriate luminous intensity that does not interrupt driving in the daytime, at nighttime, at sunrise, and at sunset.

For example, naturally, the human eye sensitively reacts with low luminous intensity in the case of a low light amount (at nighttime) and insensitively reacts with high luminous intensity in the case of a high light amount (in daytime) and, thus, light-emitting intensity may be set to correspond to a light amount of a vehicle to prevent abrupt change in a luminous intensity.

Referring to FIG. 7(b), when the monitor of the mobile terminal 200 is in an off state, traffic light information may be provided to a device in the vehicle 100.

For example, when receiving the traffic light signal as a green signal, the output unit 150 may output the indoor lighting 710 of the vehicle in an off state.

The aforementioned method according to an embodiment of the present disclosure may be embodied in a program to be executed in a computer and stored in a computer readable recording medium. Examples of the computer readable recording medium include read-only memory (ROM), random-access memory (RAM), CD-ROMs, magnetic tapes, floppy discs, optical input data storage devices, etc. The computer readable recording medium can also be distributed over network coupled computer systems so that the computer readable code is stored and executed in a distributed fashion. This media can be read by the computer, stored in the memory, and executed by the processor.

The system and method for providing forward traffic light information during stop according to the present disclosure may have the following advantageous effects.

First, advantageously, traffic light information may be smoothly provided to a driver in a vehicle during a stop so as to allow the driver to legally perform other tasks without maintaining a fixed gaze on a traffic light, thereby enhancing driver convenience.

Second, advantageously, one of the factors that can interrupt traffic flow may be removed so as to smoothly facilitate traffic flow.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method of providing forward traffic light information during a stop, the method comprising:
   capturing a front image in a vehicle;
   detecting traffic light information from the front image;
   outputting a notification corresponding to the traffic light information to a mobile terminal or the vehicle depending on at least one of a communication state with the mobile terminal and a monitor state of the mobile terminal; and
   receiving state information of a monitor of the mobile terminal, wherein
   the state information of the monitor indicates an on state or an off state, and
   when the state information of the monitor indicates the on state, the notification corresponding to the traffic light information is output through the monitor of the mobile terminal.

2. The method according to claim 1, further comprising:
   determining whether the vehicle is connected to the mobile terminal via a direct communication path.

3. The method according to claim 2, wherein as a result of the determining, when the vehicle is connected to the mobile terminal via the direct communication path, transmitting the traffic light information to the mobile terminal by the vehicle.

4. The method according to claim 2, wherein as a result of the determining, when the vehicle is not connected to the mobile terminal via the direct communication path, further comprising:
   transmitting the traffic light information to a server via wireless communication by the vehicle; and
   transmitting the traffic light information, received from the vehicle by the server, to the mobile terminal.

5. The method according to claim 4, wherein the transmitting of the traffic light information to the mobile terminal by the vehicle to the server includes transmitting a number assigned to the vehicle along with the traffic light information.

6. The method according to claim 1,
   wherein the outputting includes, when the monitor of the mobile terminal is in the on state, displaying a pop-up window corresponding to the traffic light information to overlay the monitor of the mobile terminal.

7. The method according to claim 1,
   wherein the outputting includes, when the monitor of the mobile terminal is in the on state, changing color of at least a partial region of the monitor of the mobile terminal to correspond to the traffic light information.

8. The method according to claim 1,
   wherein the outputting includes, when the monitor of the mobile terminal is in the off state, controlling indoor lighting of the vehicle in response to the traffic light information.

9. The method according to claim 8, wherein the controlling of the indoor lighting of the vehicle includes, when the traffic light information is a red signal, turning on the indoor lighting of the vehicle.

10. The method according to claim 8, wherein the controlling of the indoor lighting of the vehicle includes, when the traffic light information is a green signal, turning off the indoor lighting of the vehicle.

11. A system for providing forward traffic light information during a stop, the system comprising:
    a mobile terminal; and
    a vehicle configured to capture a front image, to detect traffic light information from the front image, and to receive state information of a monitor of the mobile terminal, wherein
    a notification corresponding to the traffic light information is output to the mobile terminal or the vehicle depending on at least one of a communication state with the mobile terminal and a monitor state of the mobile terminal,
    the state information of the monitor indicates an on state or an off state, and
    when the state information of the monitor indicates the on state, the notification corresponding to the traffic light information is output through the monitor of the mobile terminal.

12. The system according to claim 11, wherein the vehicle determines whether the vehicle is connected to the mobile terminal via a direct communication path.

13. The system according to claim 12, wherein, as a result of the determination, when the vehicle is connected to the mobile terminal via the direct communication path, the vehicle transmits the traffic light information to the mobile terminal.

14. The system according to claim 11, further comprising a server configured to communicate with the vehicle or the mobile terminal,
    wherein, as a result of the determination, when the vehicle is not connected to the mobile terminal via the direct communication path, the vehicle transmits the traffic light information to the server; and
    wherein the server transmits the traffic light information received from the vehicle to the mobile terminal.

15. The system according to claim 14, wherein the vehicle transmits a number assigned to the vehicle along with the traffic light information.

16. The system according to claim 11, wherein, when the monitor of the mobile terminal is in the on state, the mobile terminal displays a pop-up window corresponding to the traffic light information to overlay the monitor of the mobile terminal.

17. The system according to claim 11, wherein, when the monitor of the mobile terminal is in the on state, the mobile terminal changes color of at least a partial region of the monitor of the mobile terminal to correspond to the traffic light information.

18. A vehicle operatively associated with a system for providing forward traffic light information during stop, the vehicle comprising:
    a camera unit configured to capture a front image;
    a detection unit configured to detect traffic light information from the front image; and
    a controller configured to control indoor lighting to correspond to the traffic light information.

19. The vehicle according to claim 18, wherein, when the traffic light information is a red signal, the controller turns on the indoor lighting of the vehicle.

20. The vehicle according to claim 18, wherein, when the traffic light information is a green signal, the controller turns off the indoor lighting of the vehicle.

* * * * *